United States Patent
Morishima et al.

(10) Patent No.: US 10,104,272 B2
(45) Date of Patent: Oct. 16, 2018

(54) OPTICAL UNIT, IMAGING APPARATUS, AND MOVABLE OBJECT

(71) Applicant: KYOCERA CORPORATION, Kyoto (JP)

(72) Inventors: Riyou Morishima, Setagaya-ku (JP); Makoto Suzuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 14/430,781

(22) PCT Filed: Sep. 25, 2013

(86) PCT No.: PCT/JP2013/005682
§ 371 (c)(1),
(2) Date: Mar. 24, 2015

(87) PCT Pub. No.: WO2014/050095
PCT Pub. Date: Apr. 3, 2014

(65) Prior Publication Data
US 2015/0244905 A1    Aug. 27, 2015

(30) Foreign Application Priority Data

Sep. 25, 2012  (JP) .................................. 2012-211265

(51) Int. Cl.
*H04N 5/225* (2006.01)
*G02B 7/02* (2006.01)
*B60R 11/04* (2006.01)

(52) U.S. Cl.
CPC ........... *H04N 5/2254* (2013.01); *B60R 11/04* (2013.01); *G02B 7/021* (2013.01); *G02B 7/022* (2013.01); *G02B 7/026* (2013.01)

(58) Field of Classification Search
None
See application file for complete search history.

(56) References Cited

U.S. PATENT DOCUMENTS 6,507,700 B1* 1/2003 Takekuma ............. G03B 17/08
                                                                  348/81
6,559,439 B1* 5/2003 Tsuchida ................ G02B 7/026
                                                                  250/216

(Continued)

FOREIGN PATENT DOCUMENTS

CN       1460874 A     12/2003
CN     101819310 A      9/2010

(Continued)

OTHER PUBLICATIONS

Machine English Translation of Sasaki, JP 2012002947 A, Jan. 5, 2012.*

(Continued)

*Primary Examiner* — Nelson D. Hernández Hernández
(74) *Attorney, Agent, or Firm* — Studebaker & Brackett PC (57) ABSTRACT

An optical unit (13) includes an optical system (16), a lens barrel (15), and a securing portion (21). The optical system (16) includes a plurality of optical elements (22 to 26). The lens barrel (15) has an object side opening smaller than an outermost periphery of the optical element (22) closest to an object side in the optical system (16). The lens barrel (15) has an imaging side opening equal to or larger than an outermost periphery of the optical element (26) closest to an imaging side in the optical system (16). The lens barrel (15) accommodates the optical system (16). The securing portion (21), at the imaging side opening, secures the optical system (16) inserted from the imaging side opening and accommodated in the lens barrel (15).

11 Claims, 9 Drawing Sheets

(56) References Cited

U.S. PATENT DOCUMENTS

| | | | |
|---|---|---|---|
| 7,352,402 B2 | 4/2008 | Fujimoto et al. | |
| 7,965,336 B2* | 6/2011 | Bingle | B60R 11/04 348/149 |
| 8,456,769 B2 | 6/2013 | Teraoka et al. | |
| 2004/0109079 A1* | 6/2004 | Fujimoto | G02B 7/021 348/340 |
| 2008/0024883 A1* | 1/2008 | Iwasaki | G02B 7/022 359/808 |
| 2009/0225405 A1* | 9/2009 | Fujimoto | G02B 13/04 359/356 |
| 2009/0244733 A1* | 10/2009 | Sasaki | G02B 7/026 359/830 |
| 2012/0019905 A1 | 1/2012 | Teraoka et al. | |

FOREIGN PATENT DOCUMENTS

| | | |
|---|---|---|
| CN | 102227663 A | 10/2011 |
| JP | 2007-333942 A | 12/2007 |
| JP | 2009-103950 A | 5/2009 |
| JP | 2009-157279 A | 7/2009 |
| JP | 2009-244773 A | 10/2009 |
| JP | 2009-282071 A | 12/2009 |
| JP | 2010-032902 A | 2/2010 |
| JP | 2010-197816 A | 9/2010 |
| JP | 2010-197949 A | 9/2010 |
| JP | 2010-197950 A | 9/2010 |
| JP | 2010-211003 A | 9/2010 |
| JP | 2012002947 A * | 1/2012 |

OTHER PUBLICATIONS

Machine English Translation of Kymoto, JP 2007333942 A, Dec. 27, 2007.*

The First Office Action; issued by the Chinese Patent Office on Jun. 22, 2016, which corresponds to Chinese Patent Application No. 201380049709.4 and is related to U.S. Appl. No. 14/430,781; with English language translation.

International Search Report; PCT/JP2013/005682; dated Dec. 10, 2013.

Written Opinion of the International Searching Authority; PCT/JP2013/005682; dated Dec. 10, 2013; with concise explanation.

An Office Action; "Notice of Reasons for Rejection," issued by the Japanese Patent Office dated Dec. 1, 2015, which corresponds to Japanese Patent Application No. 2012-211265 and is related to U.S. Appl. No. 14/430,781; with English language concise explanation.

CN Office Action dated Feb. 3, 2017 from corresponding CN Appl No. 201380049709.4, with English translation, 11 pp.

* cited by examiner

Object side direction

Imaging side direction

OPTICAL UNIT, IMAGING APPARATUS, AND MOVABLE OBJECT

CROSS REFERENCE TO RELATED APPLICATION

This application claims priority to and the benefit of Japanese Patent Application No. 2012-211265 filed on Sep. 25, 2012, the entire contents of which are incorporated herein by reference.

TECHNICAL FIELD

The present invention relates to an optical unit for improving a yield thereof, an imaging apparatus, and a movable object.

BACKGROUND

In order to form an object image on a light receiving surface of an image sensor while suppressing aberration, a plurality of optical elements such as a lens and an diaphragm are provided in an optical unit. In order to demonstrate desired optical performance, each of the optical elements needs to be secured in a predetermined posture at a predetermined position.

As such, there is suggested to form, during manufacture of the optical unit, a diaphragm wall integrally connected to an end of an opening on an imaging side of a lens barrel for accommodating the optical elements and, via an elastic member, bias the optical elements to the diaphragm wall (see PLT 1 set forth below).

CITATION LIST

Patent Literature

PTL 1: Japanese Patent Application Laid-Open Publication No. 2010-32902

However, a manufacturing method described in PLT 1, in order to secure the optical elements inside the lens barrel, needs to press the optical elements from an object side of the lens barrel by using a securing member such as, for example, caulking. However, since the caulking is formed by deforming a portion of the lens barrel, the caulking may damage appearance and adversely affect an optical function of the optical element on the object side. These effects have been reducing a yield of the optical unit.

Accordingly, an object of the present invention in view of the above condition is to provide an optical unit capable of improving the yield thereof, an imaging apparatus, and a movable object.

SUMMARY

In order to solve the above problem, an optical unit according to a first aspect of the present invention includes:

an optical system including a plurality of optical elements;

a lens barrel having an object side opening smaller than an outermost periphery of an optical element closest to an object side in the optical system and an imaging side opening equal to or larger than an outermost periphery of an optical element closest to an imaging side in the optical system, the lens barrel for accommodating the optical system; and a securing portion for securing, at the imaging side opening, the optical system inserted from the imaging side opening and accommodated in the lens barrel.

Preferably, a second aspect of the present invention is the optical unit, wherein the lens barrel is formed such that, in a state accommodating the optical system, an end of the lens barrel on the object side does not protrude from an optical functional surface of the optical element closest to the object side in the optical system.

Preferably, a third aspect of the present invention is the optical unit, further including a spacer interposed between the optical element closest to the imaging side in the optical system and the securing portion.

Preferably, a fourth aspect of the present invention is the optical unit, wherein the securing portion is caulking obtained by deforming the imaging side opening of the lens barrel.

Preferably, a fifth aspect of the present invention is the optical unit, wherein the lens barrel includes a screw groove at the imaging side opening, and the securing portion is a retaining member for securing the optical system by being screwed together with the lens barrel.

Preferably, a sixth aspect of the present invention is the optical unit, wherein the optical element on the imaging side in the optical system has an outermost periphery equal to or larger than an outermost periphery of the optical element on the object side, and each of the optical elements is fitted in the lens barrel.

Preferably, a seventh aspect of the present invention is the optical unit, further including a support portion for supporting the optical elements from peripheral sides thereof and fitting the optical elements in the lens barrel.

Also, an imaging apparatus according to an eighth aspect of the present invention includes:

an optical unit including an optical system including a plurality of optical elements, a lens barrel having an object side opening smaller than an outermost periphery of an optical element closest to an object side in the optical system and an imaging side opening equal to or larger than an outermost periphery of an optical element closest to an imaging side in the optical system, the lens barrel for accommodating the optical system, and a securing portion for securing, at the imaging side opening, the optical system inserted from the imaging side opening and accommodated in the lens barrel; and an image sensor for capturing an object image formed by the optical system.

Further, a movable object according to a ninth aspect of the present invention includes:

an optical unit including an optical system including a plurality of optical elements, a lens barrel having an object side opening smaller than an outermost periphery of an optical element closest to an object side in the optical system and an imaging side opening equal to or larger than an outermost periphery of an optical element closest to an imaging side in the optical system, the lens barrel for accommodating the optical system, and a securing portion for securing, at the imaging side opening, the optical system inserted from the imaging side opening and accommodated in the lens barrel; and an image sensor for capturing an object image formed by the optical system.

According to the optical unit, the imaging apparatus, and the movable object structured as described above, a yield of the optical unit may be improved.

DETAILED DESCRIPTION

Hereinafter, embodiments of the present invention will be described with reference to the accompanying drawings.

Figure 1:
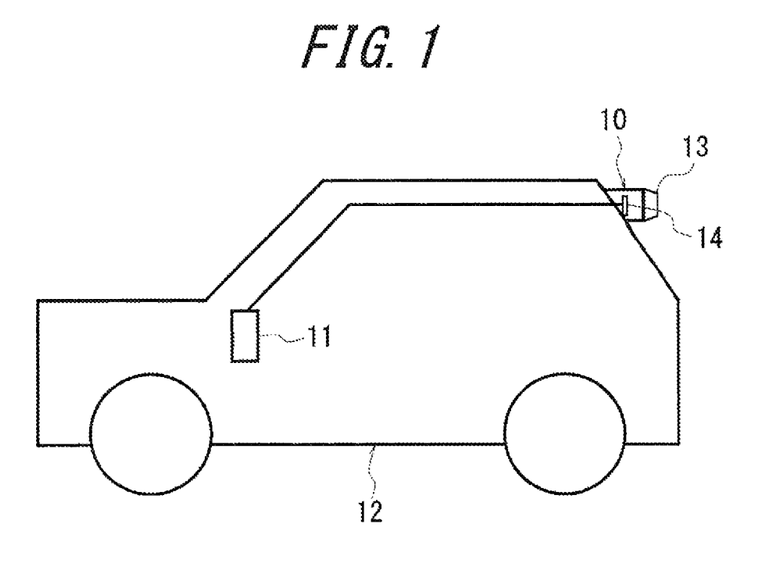
FIG. 1 is an arrangement diagram illustrating an installing position of an imaging apparatus having an optical unit according to a first embodiment of the present invention inside a movable object.

First, an imaging apparatus having an optical unit according to a first embodiment of the present invention will be described. FIG. 1 is an arrangement diagram illustrating an installing position of the imaging apparatus having the optical unit according to the first embodiment inside a movable object.

As illustrated in FIG. 1, an imaging apparatus 10 including an optical unit 13 is provided, together with a display apparatus 11, to a movable object 12. Although the imaging apparatus 10 may be located anywhere on the vehicle, the imaging apparatus 10 according to the present embodiment, in order to capture an image of a view around the vehicle as described later, is secured at a rear exterior of the movable object 12. The display apparatus 11 is provided in such a manner as to be visible from a driver's seat.

The optical unit 13 forms an object image behind the movable object on an image sensor 14 in the imaging apparatus 10. The imaging apparatus 10 captures the object image by using the image sensor 14 and transmits thus captured object image to the display apparatus 11. The display apparatus 11 displays the object image obtained from the image sensor 14.

Figure 2:
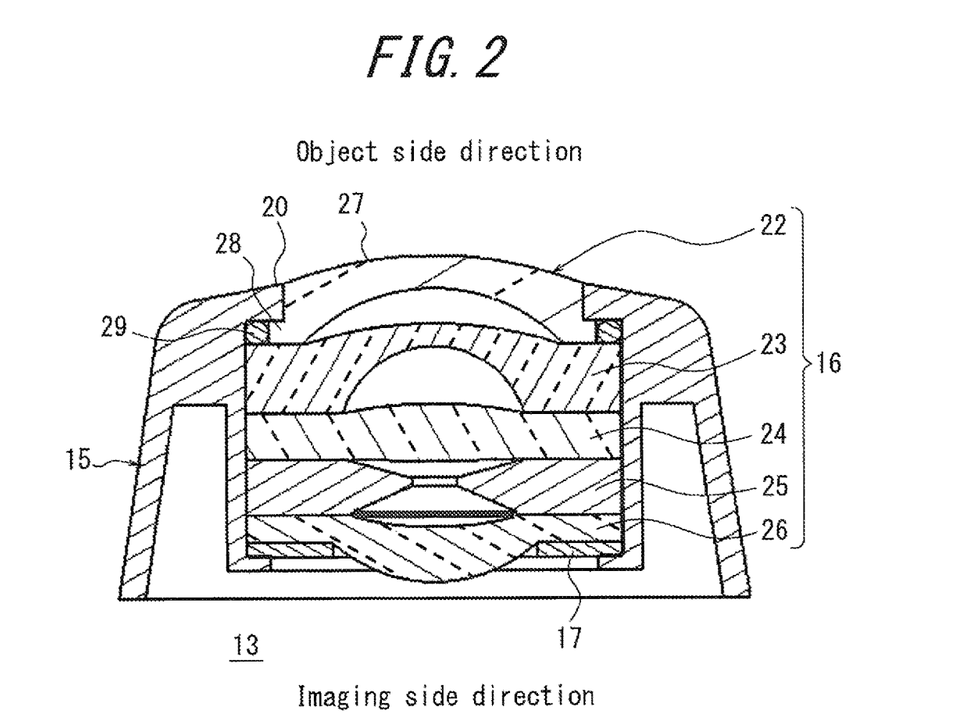
FIG. 2 is a cross-sectional diagram taken along an optical axis of the optical unit in FIG. 1.

A structure of the optical unit 13 will be described with reference to FIG. 2. FIG. 2 is a cross-sectional diagram taken along an optical axis of the optical unit 13. The optical unit 13 includes a lens barrel 15, an optical system 16, and a spacer 17.

Figure 3:
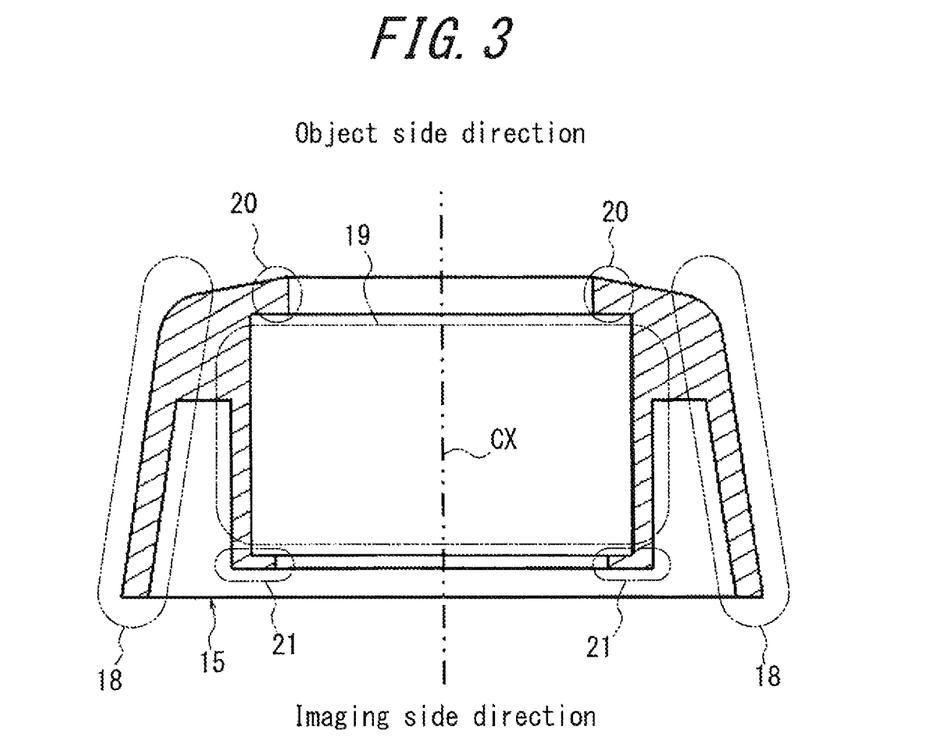
FIG. 3 is a cross-sectional diagram of a lens barrel after being assembled to form the optical unit.

The lens barrel 15, as illustrated in FIG. 3, includes an outer wall portion 18 and an accommodation portion 19. The accommodation portion 19 is formed to be rotational symmetric about a central axis CX. In the lens barrel 15, one of sides across the central axis CX is defined as an object side, and the other is defined as an imaging side.

The accommodation portion 19 accommodates the optical system 16 (see FIG. 2). The accommodation portion 19 has an inner surface in the cylindrical shape with a constant inner diameter (see FIG. 3). At an object side opening of the accommodation portion 19, a locking portion 20 in an annular shape extending towards the central axial CX is preliminarily formed. At an imaging side opening of the accommodation portion 19, as described later, a securing portion 21 is formed after assembly of the optical unit 13.

In FIG. 2, the optical system 16 includes a plurality of optical elements such as, for example, a first optical element 22, a second optical element 23, a third optical element 24, a fourth optical element 25, and a fifth optical element 26. The first optical element 22, the second optical element 23, the third optical element 24, and the fifth optical element 26 are lenses made of resin. The fourth optical element 24 is an aperture stop. The optical elements are formed and combined such that the optical system 16 has desired optical properties such as, for example, a focal length and a depth of field.

The first optical element 22 is an optical element disposed closest to the object side in the optical system 16. The first optical element 22 includes a flange portion 28 extending outward in a radial direction from a body 27. Accordingly, the flange portion 28 corresponds to an outermost periphery of the first optical element 22. An outer diameter of the body 27 substantially corresponds in size to an inner diameter of the locking portion 20 of the lens barrel 15. Also, an outer diameter of the flange portion 28 is larger than the inner diameter of the locking portion 20 and smaller than an inner diameter of the accommodation portion 19 (see FIG. 3). The body 27 and the locking portion 20 are formed in such a manner that, when the first optical element 22 is fitted in the locking portion 20 allowing the flange portion 28 to engage with the locking portion 20, there is no step between an object side plane of the first optical element 22 and the locking portion 20, that is, the object side plane of the first optical element 22 and the locking portion 20 are continuous without protruding from each other (see FIG. 2).

Diameters of outermost peripheries of the second optical element 23, the third optical element 24, the fourth optical element 25, and the fifth optical element 26 substantially correspond in size to the inner diameter of the accommodation portion 19.

The spacer 17 is a metal member formed into a ring shape having an inner diameter of a center hole larger than an outer diameter of a lens portion of the fifth optical element 26 responsible for an optical function. Also, an outer diameter of the spacer 17 substantially corresponds in size to the inner diameter of the accommodation portion 19.

Figure 4:
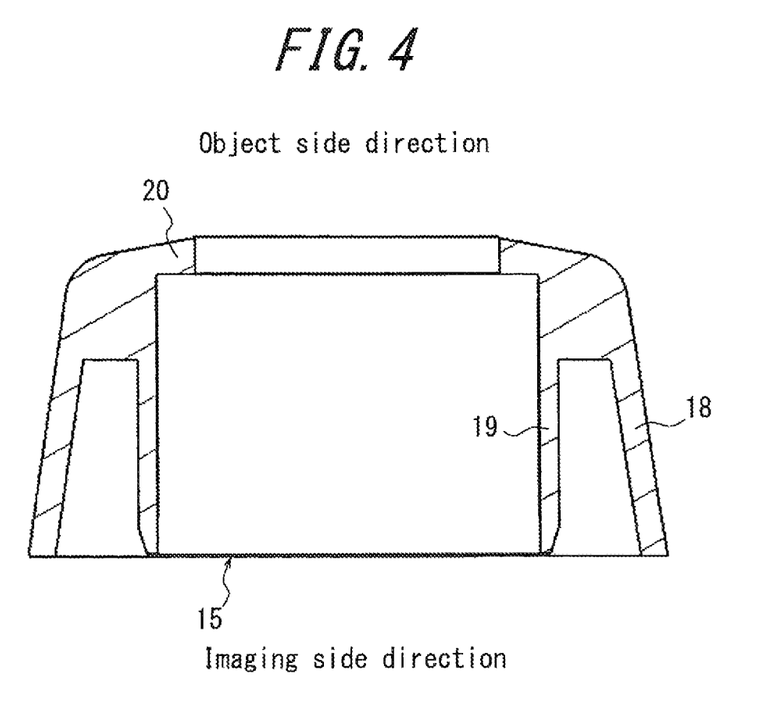
FIG. 4 is a cross-sectional diagram of the lens barrel before being assembled to form the optical unit.

The following is a method of assembling the optical unit 13 as described above. As illustrated in FIG. 4, prior to the assembly of the optical unit 13, the securing portion 21 is not formed at the imaging side opening of the accommodation portion 19, and the accommodation portion 19 is continuous to an opening end maintaining a constant inner diameter.

Figure 5:
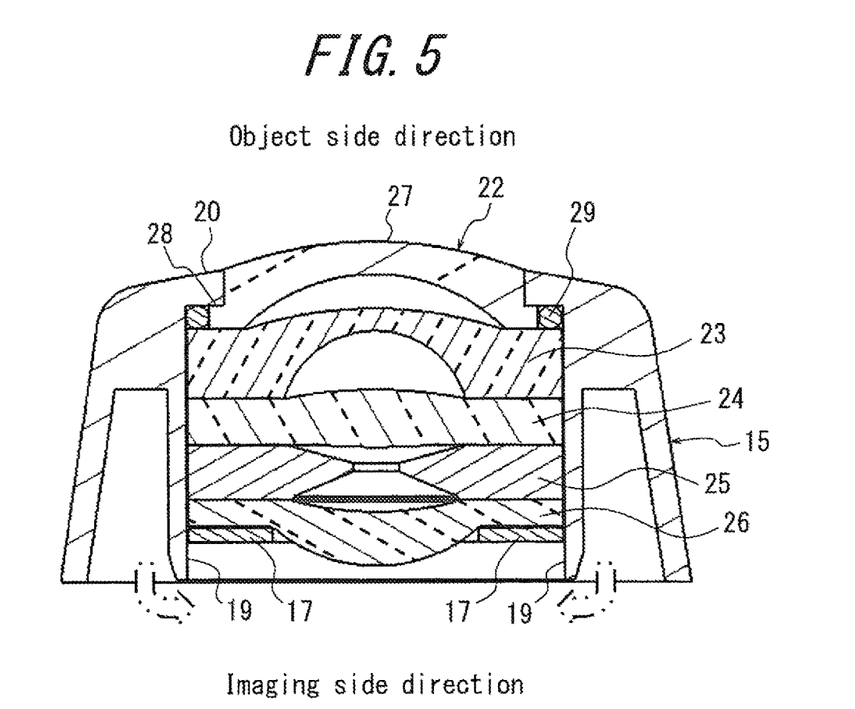
FIG. 5 is a cross-sectional diagram of the optical unit during assembling.

First, the first optical element 22 is inserted into the accommodation portion 19 from the imaging side (see FIG. 5). In such a manner that the flange portion 28 engages with the locking portion 20, the body 27 of the first optical element 22 is fitted in the locking portion 20 of the lens barrel 15. An O-ring 29 is provided between the flange portion 28 and the accommodation portion 19.

Next, the second optical element 23 to the fifth optical element 26 are inserted in a sequential order into the accommodation portion 19 and fitted therein. When the fifth optical element 26 is inserted into the accommodation portion 19, the spacer 17 is inserted. After the insertion of the spacer 17, the imaging side opening of the accommodation portion 19 is folded inward, whereby the imaging side opening is deformed and caulking serving as the securing portion 21 is formed (see FIG. 2).

In the optical system 16, generally, the further from the object side and closer to the imaging side the lens positions, the diameter of the lens becomes smaller. Therefore, in order to prevent displacement of each lens in an optical axis direction, the inner diameter of the accommodation portion is generally formed to become smaller toward the imaging side. Since it has been impossible to insert, from the imaging side, the lens with the largest diameter to be positioned closest to the object side into the accommodation portion formed as described above, the optical element has conventionally been inserted from the object side and secured.

According to the present embodiment, however, since the optical elements (the second optical element 23 to the fifth optical element 26) on the imaging side from the first optical element 22 have matching outermost peripheries, the optical elements may be inserted from the imaging side while preventing the displacement thereof in the radial direction. Therefore, unlike the conventional optical unit, the optical unit 13 according to the present embodiment allows the optical system 16 to be secured from the imaging side opening of the accommodation portion 19.

According to the optical unit of the first embodiment as described above, since the optical system 16 is secured from the imaging side opening of the accommodation portion 19, an impact on the appearance of the optical unit 13 may be prevented. As described below, further, since the first embodiment is effective in preventing the impact on the appearance of the optical unit, a yield of the optical unit may be improved.

For example, when the optical unit is used in a vehicle-mounted camera, the optical unit needs to satisfy an exterior projection requirement established for a vehicle. The conventional optical unit secured from the object side especially by forming the caulking has difficulty in satisfying the exterior projection requirement. According to the optical unit of the present embodiment, however, since there is no impact on the appearance of the optical unit 13, the optical unit may easily satisfy the exterior projection requirement.

Further, since the optical system 16 is secured from the imaging side opening of the accommodation portion 19, the displacement of the optical element on the object side (the first optical element 22) in the optical axis direction may be reduced. The conventional optical unit having the optical system secured from the object side tends to cause the displacement of the optical system at the time of caulking. According to the present embodiment, however, since the locking portion 20 is preliminarily formed at an end of the object side opening, the displacement may be reduced as compared with the conventional optical unit.

Also, since the optical system 16 is secured from the imaging side opening of the accommodation portion 19, the occurrence of vignetting may be suppressed. The conventional optical unit having the optical system secured from the object side may cause the vignetting due to the caulking formed larger than a design thereof and partially covering the lens. According to the present embodiment, however, since the locking portion 20 designed to prevent the vignetting is preliminarily formed at the end of the object side opening, the occurrence of the vignetting may be suppressed.

Also, since a lens surface of the optical element does not contact the securing portion 21, deterioration of the optical function of the optical element may be prevented. The conventional optical unit having the optical system secured by the caulking formed by thermal deformation or mechanical deformation from the object side may cause mechanical deformation or thermal deformation of the lens surface, possibly deteriorating the optical function of the lens. According to the present embodiment, however, since the optical system 16 is secured from the imaging side where the lens surface is generally smaller than that on the object side, the optical element may engage with the securing portion 21 outside a portion of the optical element responsible for the optical function. Therefore, the deterioration of the optical function of the optical element may be prevented.

According to the optical unit of the present embodiment, further, since the fifth optical element 26 is secured via the spacer 17, all of the optical elements may be made by using resin. Since the conventional optical unit as described above may cause the mechanical deformation and the thermal deformation on the lens surface, optical elements need to be made of glass that is stronger and having higher heat resistance than resin. According to the present embodiment, however, since the spacer 17 prevents the mechanical deformation and the thermal deformation of the fifth optical element 26, the fifth optical element secured by the caulking may be made of resin as well.

Next, a second embodiment of the present invention will be described. According to the second embodiment, a structure of the securing portion is different from that of the first embodiment. The following is a description of the second embodiment focusing on matters different from the first embodiment. Note that components having functions and structures the same as those of the first embodiment will be denoted by the same reference numerals.

Figure 6:
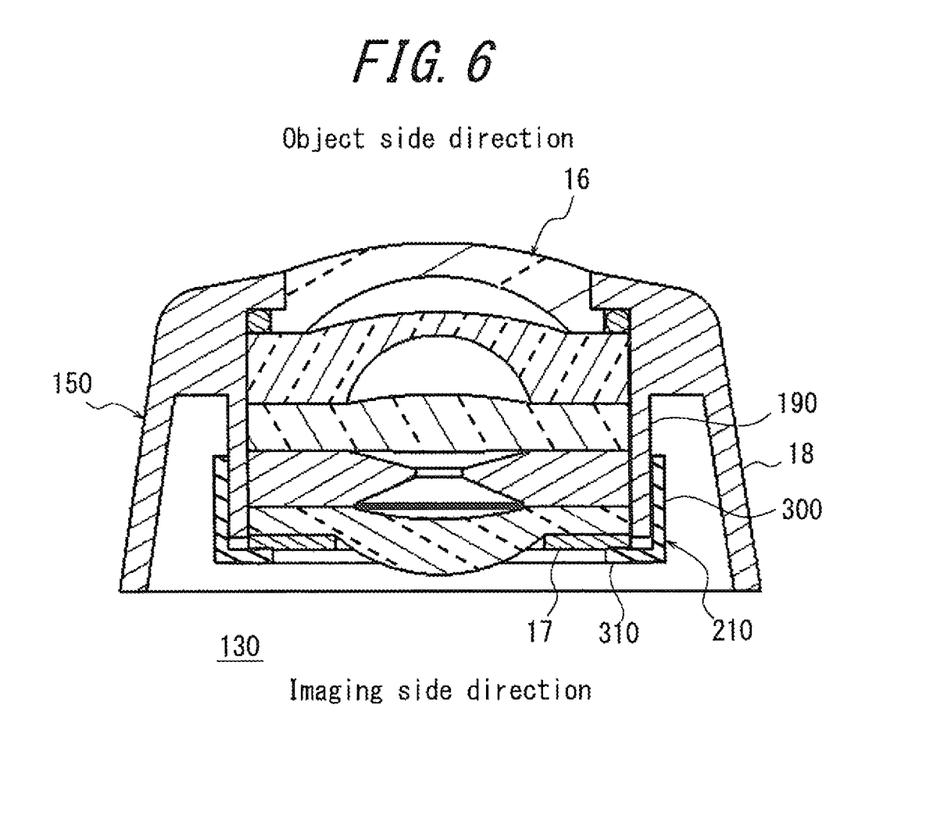
FIG. 6 is a cross-sectional diagram taken along an optical axis of an optical unit according to a second embodiment.

As illustrated in FIG. 6, an optical unit 130 includes a lens barrel 150, the optical system 16, the spacer 17, and a securing portion 210 (see FIG. 6). The structures and functions of the optical system 16 and the spacer 17 are similar to those of the first embodiment.

Similarly to the first embodiment, the lens barrel 150 includes the outer wall portion 18 and an accommodation portion 190. The structure and the function of the outer wall portion 18 are similar to those of the first embodiment. Unlike the first embodiment, a male screw is formed on an outer surface of the accommodation portion 190. Also, the accommodation portion 190 is formed to be shorter in a central axis direction than the accommodation portion 19 of the first embodiment. However, the accommodation portion 190 has a length in the central axis direction covering the outer peripheries of the first optical element 22 to the fifth optical element 26. Other than having the male screw and being shorter in the central axial direction, the accommodation portion 190 has a structure similar to the accommodation portion 19 of the first embodiment.

According to the second embodiment, the securing portion 210 includes a cylindrical portion 300 having a female screw formed on an inner surface thereof and a locking portion 310 extending inward from an end of the cylindrical portion 300. When the optical system 16 together with the spacer 17 are inserted in the accommodation portion 190, the cylindrical portion 300 and the accommodation portion 190 are screwed together, whereby the locking portion 310 secures the optical system 16 via the spacer 17 in the accommodation portion 190.

The optical unit according to the second embodiment as described above, similarly to the first embodiment, has effects of preventing the impact on the appearance of the optical unit 130, reducing the displacement, suppressing the occurrence of the vignetting, preventing the deterioration of the optical function of the optical element, and allowing for a selection of the optical element made of resin.

Next, a third embodiment of the present invention will be described. The third embodiment is different from the first embodiment in terms of securing some of the lenses in the accommodation portion by using support portions. The following is a description of the third embodiment focusing on matters different from the first embodiment. Note that components having functions and structures the same as those of the first embodiment will be denoted by the same reference numerals.

Figure 7:
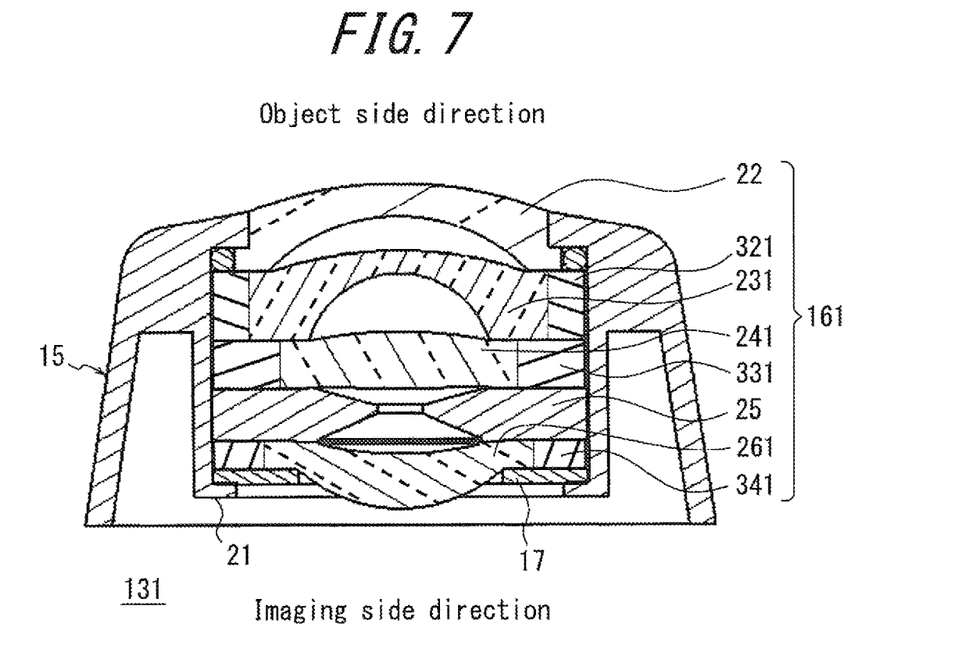
FIG. 7 is a cross-sectional diagram taken along an optical axis of an optical unit according to a third embodiment.

As illustrated in FIG. 7, an optical unit 131 includes the lens barrel 15, an optical system 161, and the spacer 17. The structures and functions of the lens barrel 15 and the spacer 17 are similar to those of the first embodiment.

The optical system 161 includes a plurality of optical elements such as, for example, the first optical element 22, a second optical element 231, a third optical element 241, the fourth optical element 25, and a fifth optical element 261, and also includes a first support portion 321, a second support portion 331, and a third support portion 341. The structures and functions of the first optical element 22 and the fourth optical element 25 are the same as those of the first embodiment. The second optical element 231, the third optical element 241, and the fifth optical element 261 are made of resin and having outer diameters smaller than the inner diameter of the accommodation portion 19.

The first support portion 321 has an inner diameter equal to an outer diameter of the second optical element 231 and an outer diameter equal to the inner diameter of the accommodation portion 19 and supports the second optical element 231 therein. The second support portion 331 has an inner diameter equal to an outer diameter of the third optical element 241 and an outer diameter equal to the inner diameter of the accommodation portion 19 and supports the third optical element 241 therein. The third support portion 341 has an inner diameter equal to an outer diameter of the fifth optical element 261 and an outer diameter equal to the inner diameter of the accommodation portion 19 and supports the fifth optical element 26 therein.

Similarly to the first embodiment, in order to assemble the optical unit 131, first, the first optical element 22 is inserted into the accommodation portion 19 from the imaging side. Next, the second optical element 231 supported by the first support portion 321, the third optical element 241 supported by the second support portion 331, the fourth optical element 25, and the fifth optical element 261 supported by the third support portion 341 are inserted in the mentioned order into the accommodation portion 19 to fit therein. Then, similarly to the first embodiment, after the spacer 17 is inserted into the accommodation portion 19, the imaging side opening of the accommodation portion 19 is folded inward, whereby the imaging side opening is deformed and the caulking serving as the securing portion 21 is formed.

The optical unit according to the third embodiment as described above, similarly to the first embodiment, has effects of preventing the impact on the appearance of the optical unit 131, reducing the displacement, suppressing the occurrence of the vignetting, preventing the deterioration of the optical function of the optical element, and allowing for the selection of the optical element made of resin.

Although the present invention has been described based on the figures and the embodiments, it is to be understood that various modifications and changes may be implemented based on the present disclosure by those who are ordinarily skilled in the art. Accordingly, such modifications and changes are included in the scope of the present invention.

Figure 8:
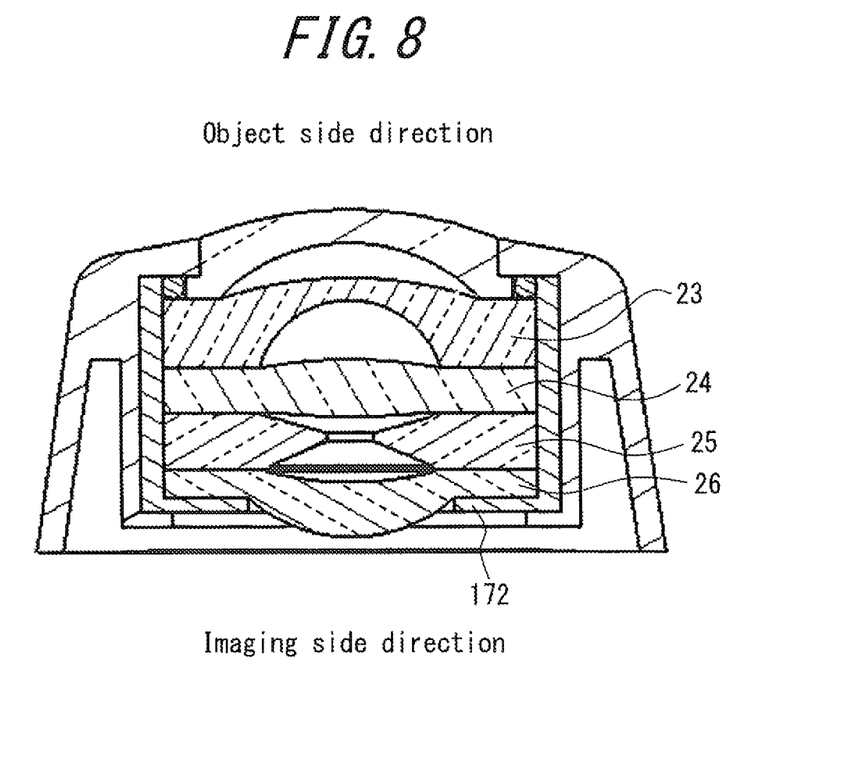
FIG. 8 is a cross-sectional diagram taken along an optical axis of an optical unit using a spacer according to a first variation.
Figure 9:
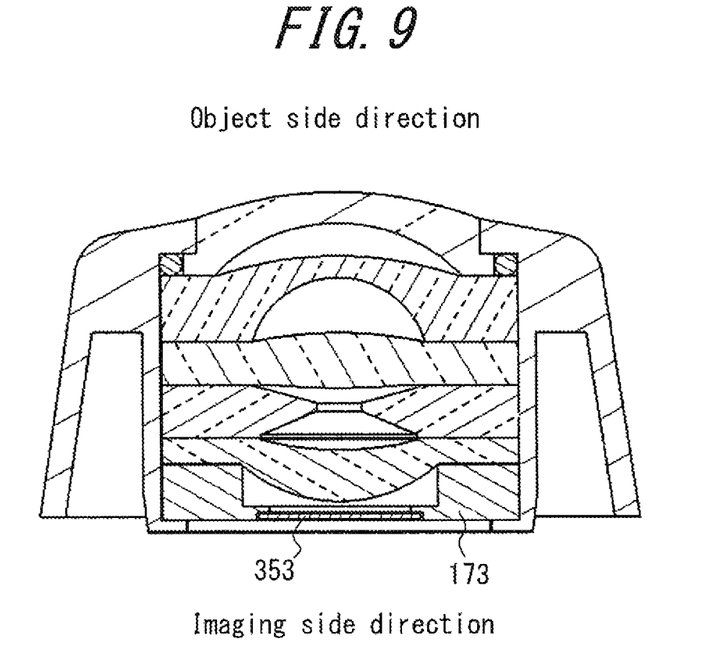
FIG. 9 is a cross-sectional diagram taken along an optical axis of an optical unit using a spacer according to a second variation.

For example, although in the first to third embodiments the spacer 17 is used to protect the fifth optical elements 26 and 261, the spacer 17 may have another function as well. As illustrated in FIG. 8, for example, a spacer 172 may have a cylindrical portion for accommodating the second optical element 23 to the fifth optical element 26 therein so as to suppress the displacement of the optical elements in the radial direction. Or, as illustrated in FIG. 9, a spacer 173 may support an optical element such as, for example, an IR cut filter 353.

Also, although in the first to third embodiments the inner surface of the accommodating portion 19 is in the cylindrical shape, the shape of the inner surface of the accommodating portion 19 is not restrictive thereto. Further, although in the first and second embodiments the outermost peripheries of the second optical element 23 to the fifth optical element 26 are in the circular shape and in the third embodiment the outermost peripheries of the first support portion 321 to the third support portion 341 are also in the circular shape, the shape of these outermost peripheries is not restrictive thereto. When a cross-section of the accommodation portion 19 is in a polygonal shape and the outermost periphery of the optical element closest to the imaging side, i.e., the fifth optical element 26 or the outermost periphery of the third support portion 341 is in a non-circular shape, as long as the imaging side opening is equal to or larger than the outermost periphery of the fifth optical element 26 or the outermost periphery of the third support portion 341, the first optical element 22 to the fifth optical element 26 may be accommodated in the accommodation unit 19 prior to the assembly of the optical unit 13 or 130. Note that "the opening is equal to or larger than the outermost periphery of the fifth optical element 26 or the outermost periphery of the third support portion 341" means that a maximum width of the opening is larger than a maximum width of the fifth optical element 26.

Also, although in the first to third embodiments the locking portion 20 of the lens barrel 15 and the flange portion 28 of the first optical element 22 are in the circular shape, the shapes of the locking portion 20 and the flange portion 28 are not restrictive thereto. When an opening of the locking portion 20 is smaller than an outermost periphery of the flange portion 28, the locking portion 20 may prevent the first optical element 22 from coming off the object side. Note that "the opening is smaller than the outermost periphery of the flange portion 28" means that a minimum width of the opening is smaller than a maximum width of the flange portion 28.

Further, although in the first and second embodiments the second optical element 23 to the fifth optical element 26 have uniform outer diameters and, simultaneously, the accommodation portions 19 and 191 have constant diameters, when, between the optical elements adjacent to one another, the outer diameter of the optical element on the imaging side is larger than the outer diameter of the optical element on the object side and the accommodation portion has an inner diameter gradually increasing toward the imaging side, all of the optical elements may be inserted from the imaging side opening.

REFERENCE SIGNS LIST 10 imaging apparatus
11 display apparatus
12 movable object
13, 130, 131 optical unit
14 image sensor
15, 150 lens barrel
16, 161 optical system
17, 172 spacer
18 outer wall
19, 190 accommodation portion 20 locking portion
21, 210 securing portion
22 first optical element
23 second optical element
24 third optical element
25 fourth optical element
26 fifth optical element
27 body
28 flange portion
29 O-ring
300 cylindrical portion
310 locking portion
321 first support portion
331 second support portion
341 third support portion
CX central axis

The invention claimed is:

1. An optical unit comprising:
an optical system including a plurality of optical elements;
a lens barrel having an object side opening smaller than an outermost periphery of an optical element closest to an object side in the optical system and an imaging side opening equal to or larger than an outermost periphery of an optical element closest to an imaging side in the optical system, the lens barrel for accommodating the optical system; and
a securing portion for securing, at the imaging side opening, the optical system inserted from the imaging side opening and accommodated in the lens barrel,
wherein the lens barrel is formed such that, in a state accommodating the optical system, an end of the lens barrel on the object side does not protrude from any portion of an optical curved surface of the optical element closest to the object side in the optical system, and the optical curved surface is free from overlap with the lens barrel in an object side direction extending from the imaging side to the object side, and
the optical element closest to the object side comprises a flange portion extending outward in a radial direction from a body of the optical element closest to the object side to contact a locking portion of the lens barrel, the flange portion is formed on a first side of the optical element closest to the object side, the first side is opposite a second side of the optical element closest to the object side, and the second side includes the optical curved surface.

2. The optical unit according to claim 1, further comprising a spacer interposed between the optical element closest to the imaging side in the optical system and the securing portion.

3. The optical unit according to claim 1, wherein
the securing portion is caulking obtained by deforming the imaging side opening of the lens barrel.

4. The optical unit according to claim 1, wherein
the lens barrel includes a screw groove at the imaging side opening, and the securing portion is a retaining member for securing the optical system by being screwed together with the lens barrel.

5. The optical unit according to claim 1, wherein
the optical element on the imaging side in the optical system has an outermost periphery equal to or larger than an outermost periphery of the optical element on the object side, and each of the optical elements is fitted in the lens barrel.

6. The optical unit according to claim 1, further comprising a support portion for supporting the optical elements from peripheral sides thereof and fitting the optical elements in the lens barrel.

7. The optical unit according to claim 1, further comprising an O-ring provided to make contact with the outermost periphery of the optical element closest to the object side.

8. The optical unit according to claim 7, wherein
the O-ring makes contact with the outermost periphery of the optical element closest to the object side and with two surfaces of the lens barrel.

9. An imaging apparatus comprising:
an optical unit according to claim 1; and
an image sensor for capturing an object image formed by the optical system.

10. A movable object having the imaging apparatus according to claim 9 mounted thereon.

11. An optical unit comprising:
an optical system including a plurality of optical elements;
a lens barrel having an object side opening smaller than an outermost periphery of an optical element closest to an object side in the optical system and an imaging side opening equal to or larger than an outermost periphery of an optical element closest to an imaging side in the optical system, the lens barrel for accommodating the optical system;
a securing portion for securing, at the imaging side opening, the optical system inserted from the imaging side opening and accommodated in the lens barrel; and
an O-ring provided to make contact with the outermost periphery of the optical element closest to the object side,
wherein the lens barrel is formed such that, in a state accommodating the optical system, an end of the lens barrel on the object side does not protrude from any portion of an optical curved surface of the optical element closest to the object side in the optical system, and the optical curved surface is free from overlap with the lens barrel in an object side direction extending from the imaging side to the object side, and
the O-ring makes contact with the outermost periphery of the optical element closest to the object side and with two surfaces of the lens barrel.

\* \* \* \* \*